(12) United States Patent
Geant et al.

(10) Patent No.: US 11,725,563 B2
(45) Date of Patent: Aug. 15, 2023

(54) MIXER, EXHAUST AFTERTREATMENT COMPONENT, EXHAUST AFTERTREATMENT SYSTEM AND VEHICLE

(71) Applicant: Faurecia Emission Control Technologies (Shanghai) Co., Ltd, Shanghai (CN)

(72) Inventors: Ludovic Geant, Shanghai (CN); Pierre-Yves Hallier, Shanghai (CN); Thibault Fouquet, Shanghai (CN); Jian Gao, Shanghai (CN)

(73) Assignee: Faurecia Emission Control Technologies (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/896,792

(22) Filed: Aug. 26, 2022

(65) Prior Publication Data
US 2023/0061888 A1 Mar. 2, 2023

(30) Foreign Application Priority Data
Aug. 26, 2021 (CN) .......................... 202122035592.9

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01); *F01N 2450/18* (2013.01); *F01N 2450/22* (2013.01); *F01N 2570/14* (2013.01); *F01N 2610/02* (2013.01); *F01N 2610/148* (2013.01); *F01N 2610/1453* (2013.01)

(58) Field of Classification Search
CPC ........ F01D 25/04; F01D 25/16; F01D 25/164; F01D 25/18; F02B 37/00; F02B 39/14; F01M 11/02; F01M 2011/021; F16C 17/026; F16C 2360/24; F16C 33/107; F16C 33/6637; F05D 2220/40; F05D 2240/54;
(Continued)

(56) References Cited
U.S. PATENT DOCUMENTS 8,707,687 B2 * 4/2014 Aneja .................... F01N 3/033
422/171
9,670,811 B2 * 6/2017 De Rudder ........... B01F 25/102
(Continued)

FOREIGN PATENT DOCUMENTS

CN 211397693 U * 9/2020 .......... B01F 3/04049
CN 218407577 U * 1/2023
WO WO-2019144600 A1 * 8/2019

*Primary Examiner* — Jesse S Bogue
(74) *Attorney, Agent, or Firm* — Quarles & Brady LLP

(57) ABSTRACT

A mixer, an exhaust aftertreatment component, an exhaust aftertreatment system and a vehicle in which the mixer comprises: an inlet cover, providing an inlet space; an outlet cover, providing an outlet space; and a connecting pipe part, comprising a gas inlet inside the inlet space, a gas outlet inside the outlet space, and an injection inlet; wherein the connecting pipe part comprises a conical section and a pipe section connected downstream to the conical section, the conical section is located inside the inlet space, a side wall of the conical section comprises a plurality of openings distributed along a circumferential direction, the gas inlet comprises the plurality of openings, and a swirling structure is provided on the plurality of openings.

21 Claims, 15 Drawing Sheets

(58) Field of Classification Search
CPC ............ F05D 2260/96; F05D 2260/98; F16N 2210/14; Y02T 10/12; F01N 2240/20; F01N 2450/18; F01N 2450/22; F01N 2570/14; F01N 2610/02; F01N 2610/1453; F01N 2610/148; F01N 3/2066; F01N 3/2892

See application file for complete search history.

(56) References Cited

U.S. PATENT DOCUMENTS

| | | | |
|---|---|---|---|
| 10,369,533 B2* | 8/2019 | Whitten | B01F 25/10 |
| 10,662,851 B2* | 5/2020 | Tummala | B01F 25/3133 |
| 10,690,034 B2* | 6/2020 | Sandou | F01N 3/035 |
| 11,300,030 B2* | 4/2022 | Johnson | F01N 3/2892 |
| 11,499,461 B2* | 11/2022 | Panunzio | B01F 25/32 |
| 2010/0257850 A1* | 10/2010 | Kowada | F01N 13/08 |
| | | | 60/297 |
| 2014/0196444 A1* | 7/2014 | Watahiki | F01N 3/208 |
| | | | 60/297 |
| 2016/0069239 A1* | 3/2016 | Freeman | F01N 13/1888 |
| | | | 60/324 |
| 2016/0115847 A1* | 4/2016 | Chapman | B01F 25/4331 |
| | | | 60/324 |
| 2021/0404367 A1* | 12/2021 | Alano | F01N 3/2066 |
| 2022/0065148 A1* | 3/2022 | Sudries | F01N 3/2892 |
| 2022/0316382 A1* | 10/2022 | De Rudder | F01N 3/2892 |
| 2022/0356832 A1* | 11/2022 | Brenner | F01N 3/2066 |

* cited by examiner low     Exhaust Backpressure     high

MIXER, EXHAUST AFTERTREATMENT COMPONENT, EXHAUST AFTERTREATMENT SYSTEM AND VEHICLE

CROSS-REFERENCE TO RELATED APPLICATIONS

This application claims priority to Chinese Application No. 202122035592.9 filed Aug. 26, 2021, the disclosure of which is incorporated herein by reference in its entirety and for all purposes.

TECHNICAL FIELD

The application relates to a field of engine exhaust aftertreatment, in particular to a mixer, an exhaust aftertreatment system and a vehicle.

BACKGROUND

Engine exhaust aftertreatment system processes hot exhaust generated by engine through various upstream exhaust components to reduce emission of pollutants. Various upstream exhaust components may comprise one or more of the following components: pipes, filters, valves, catalysts, silencers, etc. For example, the upstream exhaust component directs the exhaust into a diesel oxidation catalyst (DOC) with an inlet and outlet. A diesel particulate filter (DPF) can be set at the downstream of the diesel oxidation catalyst. Downstream of the diesel oxidation catalyst and the optional diesel particulate filter is a selective catalytic reduction (SCR) reactor with an inlet and an outlet. The outlet connects the exhaust to downstream exhaust components. The mixer is located at the outlet of DOC or downstream of DPF and upstream of the inlet of SCR. In the mixer, the exhaust generates swirling motion or rotating motion. The injector is used to spray urea aqueous solution spray from the upstream of SCR into the exhaust flow, so that the mixer can fully mix the urea and exhaust together and discharge them into SCR for reduction reaction to generate nitrogen and water, so as to reduce the nitrogen oxide emission of the engine.

SUMMARY

An object of the disclosure is to provide a mixer.
Another object of the disclosure is to provide an engine exhaust aftertreatment system.
Another object of the disclosure is to provide a vehicle.
A mixer, according to one aspect of the disclosure, comprises an inlet cover providing an inlet space; an outlet cover providing an outlet space; a connecting pipe part, comprising a gas inlet inside the inlet space, a gas outlet inside the outlet space, and an injection inlet; wherein, the connecting pipe part comprises a conical section and a pipe section connected downstream to the conical section, the conical section is located inside the inlet space, a side wall of the conical section comprises a plurality of openings distributed along a circumferential direction, the gas inlet comprises the plurality of openings, and a swirling structure is provided at the plurality of openings; a small end of the conical section provides the injection inlet, the inlet cover is provided with an injector mounting base, defining an injection axis, and an axis of the conical section coincides with the injection axis; and an axis of a part of the connecting pipe inside the outlet space coincides with a symmetry axis of the outlet cover, and the gas outlet is an oblique notch structure.

In one or more embodiments of the mixer, the swirling structure comprises a swirling vane provided at each opening, and the swirling vane extends in an inclined direction that covers each of the openings and goes outward the conical section.

In one or more embodiments of the mixer, the injector mounting base and the connecting pipe part are arranged in a partial contact or non-contact manner, the injector mounting base has a rib extending circumferentially inside the inlet space, and there is a gap between the rib and the small end of the conical section, providing a flow path for exhaust to enter the connecting pipe in addition to the gas inlet.

In one or more embodiments of the mixer, the inlet cover comprises a recessed section, and a space between the recessed section and an edge of a cylindrical profile of the inlet cover provides a mounting space for an injector.

In one or more embodiments of the mixer, the inlet cover has at least two sensor bases symmetrically distributed on the inlet cover, and/or the outlet cover has at least two sensor bases symmetrically distributed on the outlet cover.

In one or more embodiments of the mixer, the pipe section comprises a first pipe section and a second pipe section downstream of the first pipe section, the first pipe section is connected to a large end of the conical section and is fixedly connected to the inlet cover, an outer wall of one of the first pipe section and the second pipe section is provided with a sealing member and the outer wall is connected with an inner wall of the other in an overlapped manner, the outer wall is further provided with a first mating section that partially surrounds the sealing member on one side thereof, a second mating section extends from an end of the other and partially surrounds the sealing member on the other side thereof, and the first mating section and the second mating section is fixed connected by a V-clamp.

In one or more embodiments of the mixer, the pipe section comprises a first pipe section and a second pipe section downstream of the first pipe section, the first pipe section is connected to a large end of the conical section and is fixedly connected to the inlet cover, and the second pipe section comprises the gas outlet inside the outlet space and is fixedly connected to the outlet cover, and the first pipe section and the second pipe section are integrated connected or welded together.

In one or more embodiments of the mixer, the pipe section comprises a first pipe section, a second pipe section downstream of the first pipe section and a connecting sleeve, the first pipe section is connected to a large end of the conical section, the connecting sleeve is sleeved on periphery of first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, and the second end has a connecting flange; a flaring structure is formed by extending upward from an upstream end of the second pipe section, wherein the flaring structure is connected with downstream side of the connecting flange in an overlapped manner, a sealing member is mounted therebetween for sealing, and the flaring structure and the connecting flange is fixedly connected by a V-clamp, so as to connect the connecting sleeve with the second pipe section; and a downstream end of the first pipe section extends into the upstream end of the second pipe section with an axial length.

In one or more embodiments of the mixer, the pipe section comprises a first pipe section, a second pipe section downstream of the first pipe section and a connecting sleeve, the first pipe section is connected to a large end of the conical section, the connecting sleeve is sleeved on periphery of the first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, and the second end and the second pipe section are integrated connected or welded together; and a downstream end of the first pipe section extends into an upstream end of the second pipe section with an axial length.

In one or more embodiments of the mixer, the pipe section comprises a first pipe section, a second pipe section downstream of the first pipe section and a connecting sleeve, the first pipe section is connected to a large end of the conical section, the connecting sleeve is sleeved on periphery of the first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, an outer wall of one of the second end and the second pipe section is provided with a sealing member and the outer wall is connected with the inner wall of the other in an overlapped manner, the outer wall is further provided a first mating section that partially surrounds the sealing member on one side thereof, a second mating section extends from an end of the other and partially surrounds the sealing member on the other side thereof, and the first mating section and the second mating section is fixed connected by a V-clamp; and a downstream end of the first pipe section extends into an upstream end of the second pipe section with an axial length.

In one or more embodiments of the mixer, the open size of the oblique notch structure is a flare from upstream to downstream.

In one or more embodiments of the mixer, an upper surface of the outlet cover comprises a non-flat area, and/or an upper surface of the inlet cover comprises a non-flat area.

In one or more embodiments of the mixer, an open end of the outlet cover is provided with a perforated baffle, and the perforated baffle is arranged further away from an upper surface of the outlet cover with respect to the gas outlet of the connecting pipe.

In one or more embodiments of the mixer, the inlet cover and the outlet cover are arranged separately and are detachably connected by the connecting pipe part directly or indirectly.

In one or more embodiments of the mixer, the connecting pipe comprises a first pipe part and a second pipe part, wherein the first pipe part comprises the gas inlet and is fixedly connected with the inlet cover, forming a first assembly unit; the second pipe part comprises the gas outlet and is fixedly connected with the outlet cover, forming a second assembly unit; and the first assembly unit and the second assembly unit are detachably connected directly or indirectly.

In one or more embodiments of the mixer, an axis of the inlet cover and the axis of the outlet cover are set to be relatively rotatable in three dimensions.

A mixer, according to one aspect of the disclosure, comprises an inlet cover providing an inlet space, and a connecting pipe part that comprises a gas inlet, a gas outlet and an injection inlet, wherein the gas inlet is located inside the inlet space, the connecting pipe is fixedly connected to the inlet cover to form a first mixing unit, and the first mixing unit is used for being directly or indirectly connected to an exhaust aftertreatment component downstream the mixer, wherein the inlet cover and the connecting pipe part are the inlet cover and the connecting pipe part described in any of the above.

An exhaust aftertreatment component, according to one aspect of the disclosure, comprises an outlet cover and an exhaust aftertreatment component casing covered by the outlet cover, wherein an exhaust aftertreatment element is provided inside the exhaust aftertreatment component casing, the outlet cover provides a flowing space for gas flow entering the exhaust aftertreatment component, and the outlet cover is used for being directly or indirectly connected to the connecting pipe part of the mixer.

An exhaust aftertreatment system, according to one aspect of the disclosure, comprises a mixer described in any of the above and an injector, wherein the injector sprays a reducing agent solution to an injection inlet of the connecting pipe part.

In one or more embodiments of the exhaust aftertreatment system, an open end of the inlet cover is connected with a first part of the exhaust aftertreatment system, and an open end of the outlet cover is connected with a second part of the exhaust aftertreatment system.

A vehicle, according to one aspect of the disclosure, comprises an engine and an exhaust aftertreatment system described in any one of the above.

The progressive effect of the disclosure comprises one or a combination of the following:

1. Through the structure of the inlet cover and the connecting pipe in the mixer, the exhaust and reducing agent are fully and evenly mixed;

2. The mixer structure in which the inlet cover and the outlet cover are detachably connected through the connecting pipe part is adopted, so that the mixer structure can flexibly adapt to the installation space layout requirements of different vehicles by changing the length and extension direction of the pipe body, as well as the orientation of the inlet cover and the outlet cover, the versatility of the mixer and the exhaust aftertreatment system is good, and the space layout of the vehicle is compact.

BRIEF DESCRIPTION OF THE DRAWINGS

The above and other features, properties and advantages of the disclosure will become more obvious through the following description in combination with the attached drawings and embodiments. It should be noted that the attached drawings are only examples, which are not drawn according to the conditions of equal scale, and should not be used as a limitation on the scope of protection actually required by the disclosure, in which.

Figure 1:
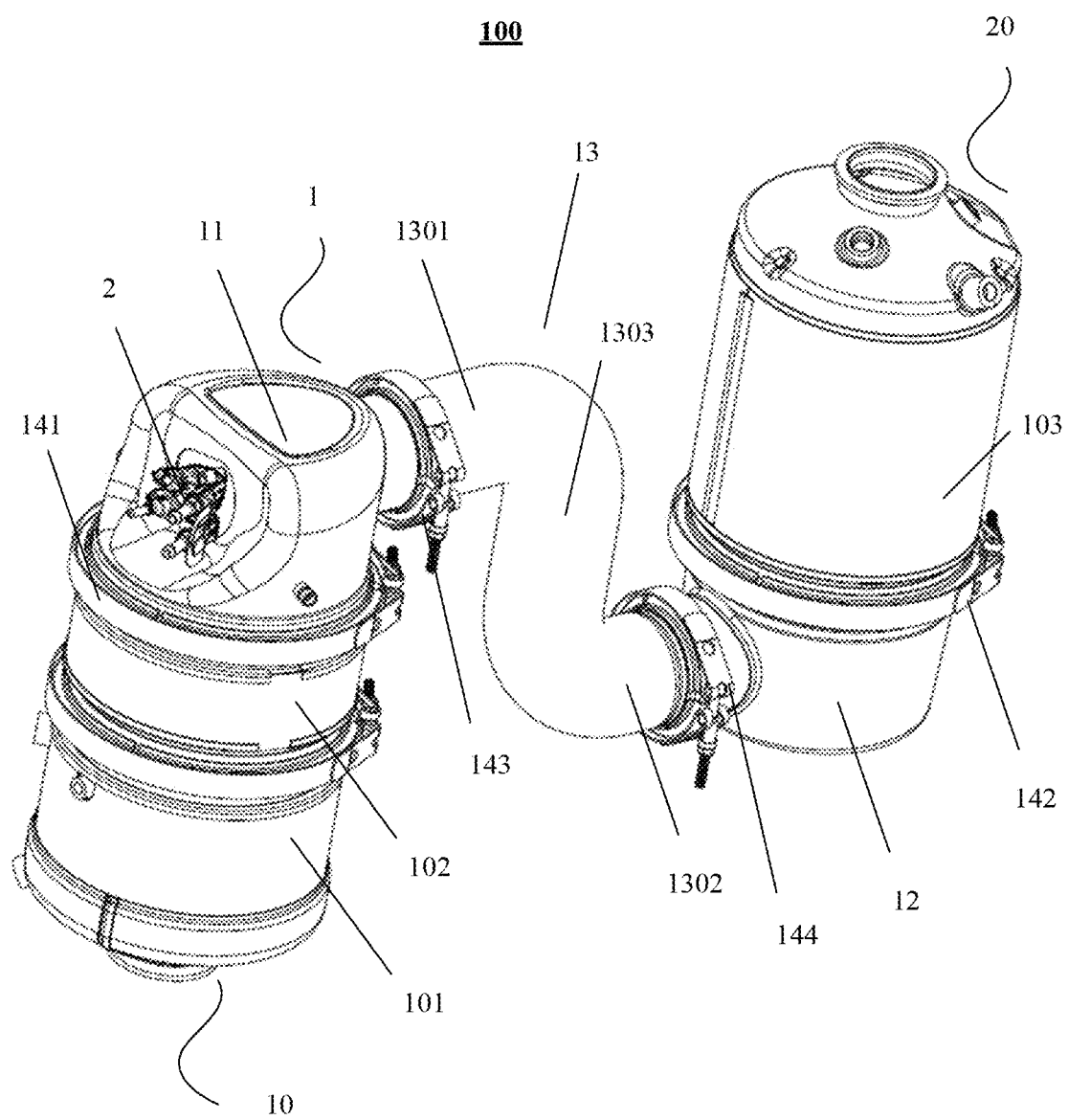
FIG. 1 is a structural diagram of an engine exhaust aftertreatment system of an embodiment.

REFERENCE SIGNS 100 exhaust aftertreatment system
10 the first part
20 the second part
101 diesel oxidation catalyst
102 diesel particulate filter
103 selective catalytic reduction
1 mixer
11 inlet cover
111 open end
112 injector mounting base
1121 rib
114 recessed section
115 edge of the cylindrical profile
116 installation space
117 sensor base
12 outlet cover
120 upper surface of the cover
121 open end
13 connecting pipe
131 gas inlet
132 gas outlet
133 injection inlet
134 conical section
1341 opening
1342 swirling structure
1343 swirling vane
1344 small end of conical section
135 pipe section
1351 first pipe section
1352 second pipe section
1354 connecting sleeve
13540 sleeve body
13541 first end
13542 second end
13543 radial recess
13521 flared structure
1301 first section
1302 second section
1303 third section
1311 first pipe section
1312 second pipe section
201 first assembly unit
202 second assembly unit
141, 142, 143, 144, 145, 146 V-clamp
15 perforated baffle
2-injector

DETAILED DESCRIPTION OF EMBODIMENTS

The following discloses a variety of different implementations or embodiments of the subject technical proposal. In order to simplify the disclosure, the following describes specific examples of each element and arrangement. Of course, these are only examples, not limiting the protection scope of the disclosure.

It should be noted that in the following description, for example, "one embodiment", "an embodiment", and/or "some embodiments" refer to a feature, structure or characteristic related to at least one embodiment of the present application. Therefore, it should be emphasized and noted that "an embodiment" or "one embodiment" or "one or more embodiments" mentioned twice or more in different positions in this specification do not necessarily refer to the same embodiment. In addition, some features, structures or characteristics in one or more embodiments of the present application may be appropriately combined.

Referring to FIG. 1, in an embodiment, an exhaust aftertreatment system 100 of a vehicle is used to process exhaust generated by an engine of the vehicle, and the exhaust aftertreatment system 100 may be a mixer 1 comprising a first part 10 and a second part 20 and connecting the two. The first part 10 may comprise a diesel oxidation catalyst (DOC) 101, a diesel particulate filter (DPF) 102, and the second part 20 may comprise a selective catalytic reduction (SCR) 103. The diesel oxidation catalyst and diesel particle catcher described above are frequently used terms in this field, but are not limited to DOC and DPF, which can only be used in the exhaust aftertreatment system of diesel engines. The exhaust successively passes through the diesel oxidation catalyst 101 to process the unburned hydrocarbon and carbon monoxide in the exhaust. After the diesel particle catcher 102 processes the particulate pollutants in the exhaust, it enters the mixer 1 and is mixed with the spray of urea solution sprayed by the injector 2. The mixed air flow flows out of the mixer 1 and enters the selective catalytic reduction 103, carrying out a reduction reaction to generate nitrogen and water under the action of catalyst, to treat nitrogen oxides in the exhaust. It can be understood that the exhaust aftertreatment system 100 is not limited to the above, for example, in some exhaust aftertreatment systems, the particle trap 102 can also be omitted. The "vehicles" mentioned above refers to the means of delivery in a broad sense, comprising vehicles in a narrow sense such as automobiles, trucks and ships, as well as vehicles with specific functions such as construction machinery and agricultural machinery. The beneficial effects of the mixer and exhaust aftertreatment system of the embodiment comprise good versatility, and the beneficial effects of the vehicle comprise compact space layout. The above beneficial effects will be described in more detail in the following introduction.

Figure 2:
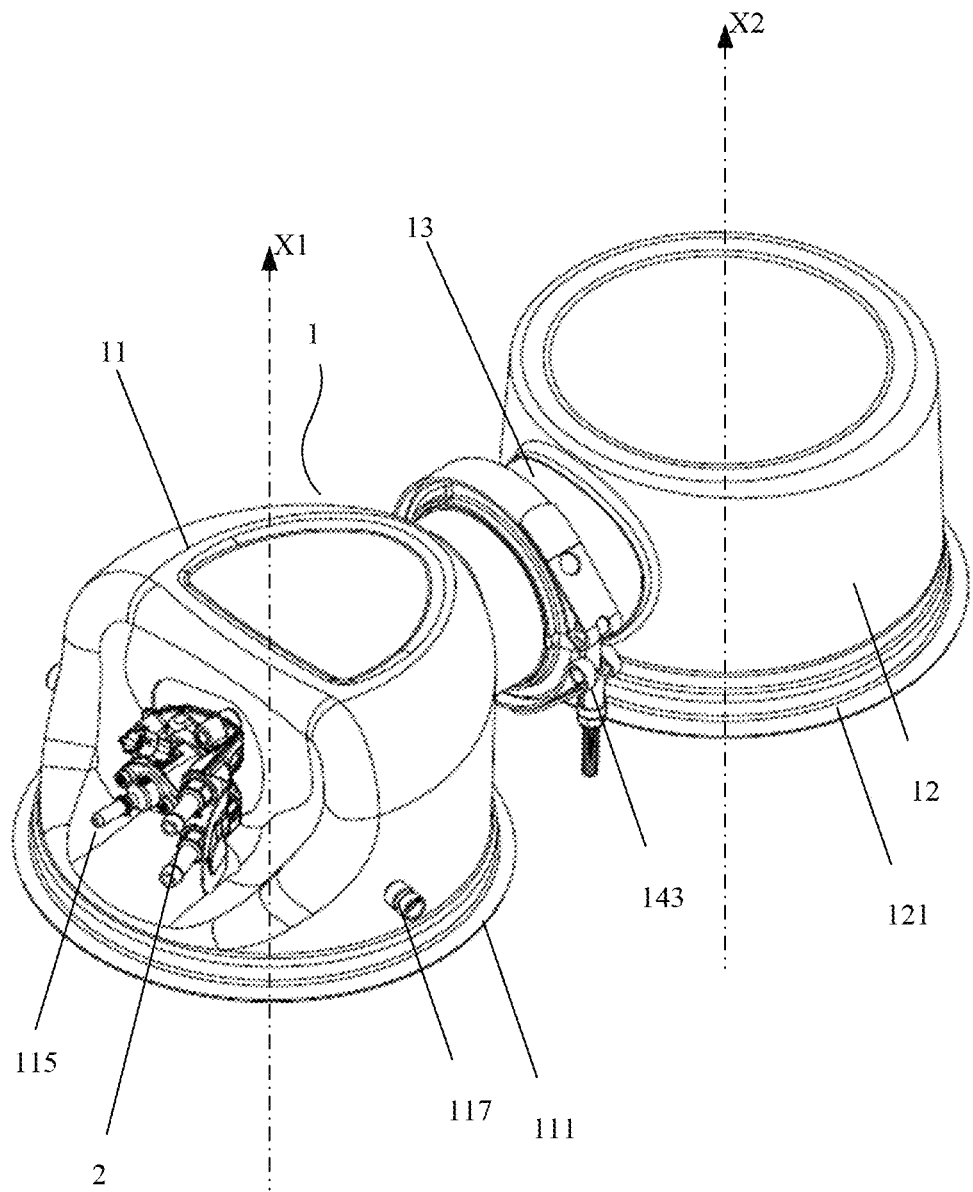
FIG. 2 is a structural diagram of a mixer and an injector of an embodiment.
Figure 3:
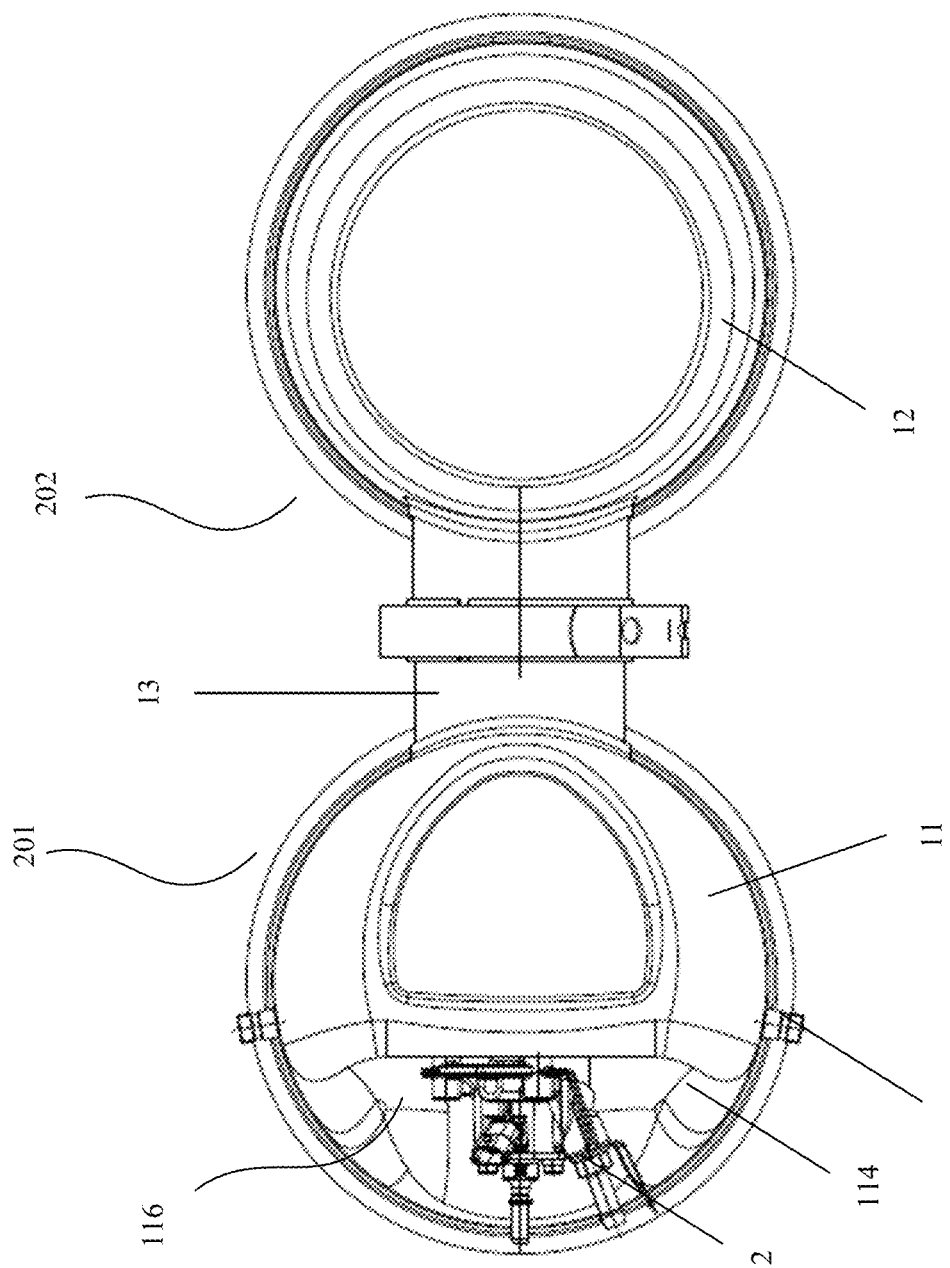
FIG. 3 is a structural diagram of the FIG. 2 in a vertical view angle.

As shown in FIG. 1 and FIG. 2, in some embodiments, the mixer 1 comprises an inlet cover 11, an outlet cover 12, and a connecting pipe 13. The inlet cover 11 provides the inlet space S1 of the mixer, and the outlet cover 12 provides the outlet space S2 of the mixer. The connecting pipe 13 comprises a gas inlet 131 located in the inlet space S1, a gas outlet 132 located in the outlet space S2, and an injection inlet 133. The inlet cover 11 is connected with the outlet cover 12 through the connecting pipe 13 to form the mixer 1. The exhaust enters the inlet space S1 from the open end 111 of the inlet cover 11 and enters the connecting pipe part from the gas inlet 131. The urea solution spray sprayed by the injector 2 enters the connecting pipe part from the injection inlet 133. The swirling exhaust and the spray are mixed in the connecting pipe part, and the mixed gas flow flows out of the gas outlet 132 and enters the selective catalytic reduction 103 through the open end 121 of the outlet cover 12. As shown in FIG. 1, the open end 111 of the inlet cover 11 is connected with the first part 10 of the exhaust aftertreatment system 100 through the V-clamp 141, specifically with the diesel particle trap 102 of the first part 10, and the open end 121 of the outlet cover 12 is connected with the second part 20 of the exhaust aftertreatment system 100 through the V-clamp 142. Specifically, it can be connected with the selective catalytic reduction 103 of the second part 20. The beneficial effect of the above-described embodiment is that the mixer 1 is formed by detachable connection of the inlet cover 11 and the outlet cover 12 through the connecting pipe part 13, so that the mixer 1 can change the length and extension direction of the connecting pipe part 13 and the orientation of the inlet cover 11 and the outlet cover 12 without changing the structure of the inlet cover 11 and the outlet cover 12. That is, the structure of the mixer can flexibly adapt to the installation space layout requirements of different vehicles, the mixer and exhaust aftertreatment system have good versatility, and the space layout of vehicles is compact. Specifically, for example, reference can be made to the embodiments shown in FIG. 1 and FIG. 2. In the embodiment shown in FIG. 1, the structure of the connecting pipe part 13 connecting the inlet cover 11 and the outlet cover 12 is an approximate Z-shape with two bends, that is, it comprises the first section 1301, the second section 1302, and the third section 1303. The two ends of the third section 1303 are connected with the first section 1301 and the second section 1302 respectively.

Figure 13A:
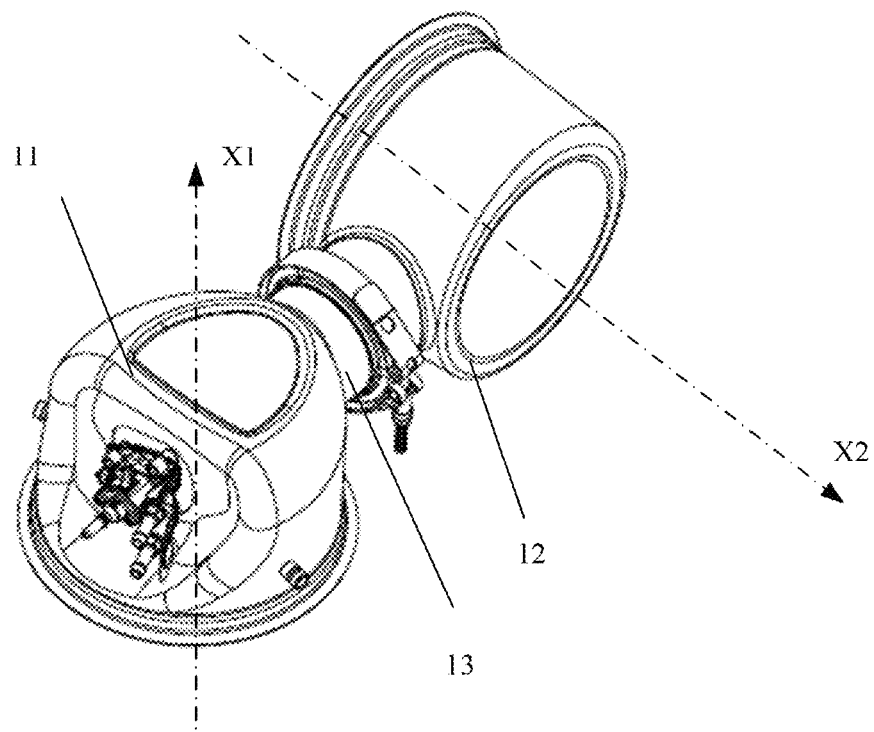
FIGS. 13A to 13D are structural diagrams of different angles between the axis of the inlet cover and the axis of the outlet cover of the mixer in different embodiments.
Figure 13B:
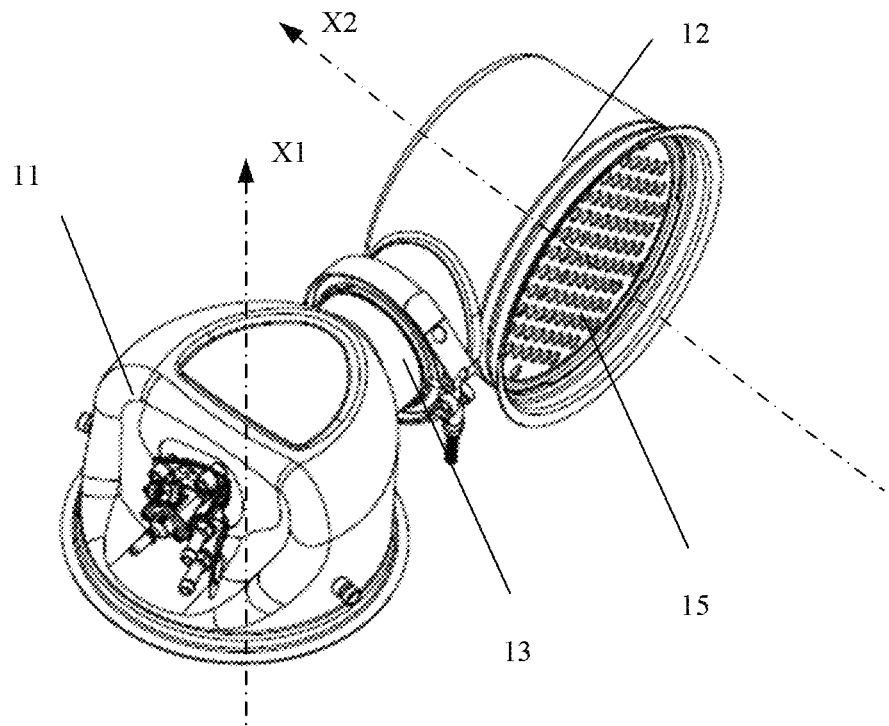
Figure 13C:
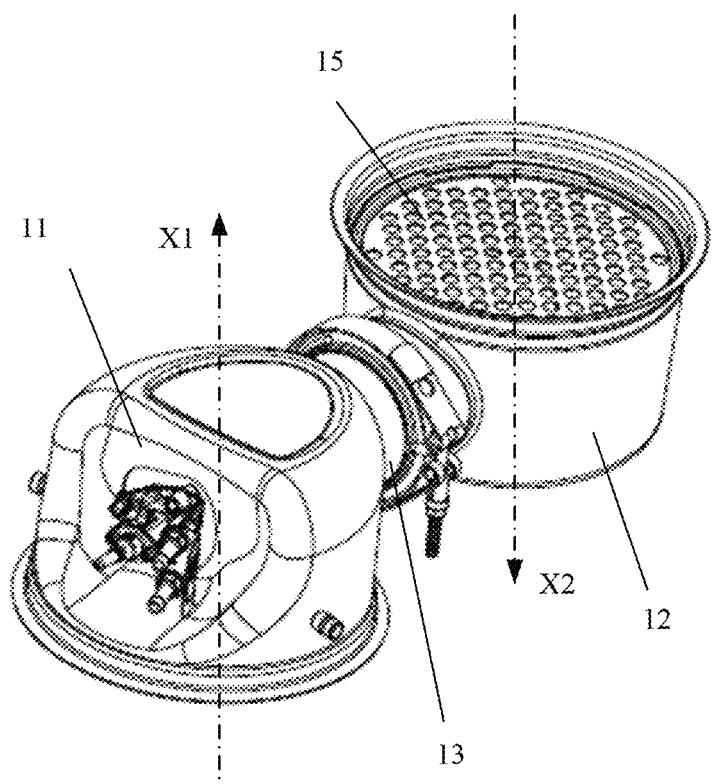
Figure 13D:
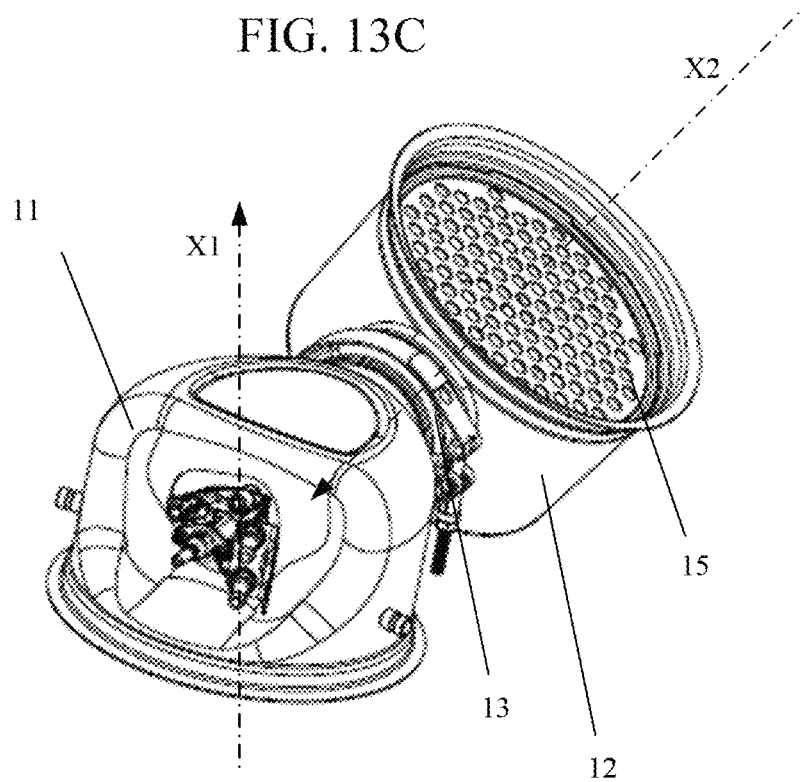

In the embodiment shown in FIG. 2, the structure of the connecting pipe part 13 detachably connecting the inlet cover 11 and the outlet cover 12 is a straight pipe. In the embodiment of FIG. 1, there is a first arrangement space between the third section 1303 and the first part 10, and a second arrangement space between the third end and the second part 20, which can be used for the installation of other parts in the vehicle, or it can adapt to the installation layout in which the first part 10 and the second part 20 are fixed at a specific position in the vehicle, and flexibly install the first part 10 and the second part 20. In addition, as shown in FIG. 2 and FIG. 13A to FIG. 13D, the orientation of the inlet cover 11 and the outlet cover 12 can also be flexibly changed, and the axis X1 of the inlet cover 11 and the axis X2 of the outlet cover 12 can be arranged by three-dimensional relative rotation. For example, in the embodiment shown in FIG. 2, the angle between the axis X1 of the inlet cover 11 and the axis X2 of the outlet cover 12 is 0°. Taking the axis X1 of the inlet cover 11 as the reference, in the embodiment shown in FIG. 13A, the axis X2 of the outlet cover 12 rotates 90° clockwise relative to the axis X1 of the inlet cover 11, compared with the embodiment shown in FIG. 2. In the embodiment shown in FIG. 13B, compared with the embodiment in FIG. 2, the axis X2 of the outlet cover 12 rotates 90° anti-clockwise or 270° clockwise relative to the axis X1 of the inlet cover 11. In the embodiment shown in FIG. 13C, the axis X2 of the outlet cover 12 rotates 180° anti-clockwise or 180° clockwise relative to the axis X1 of the inlet cover 11 compared with the embodiment in FIG. 2. In the embodiment shown in FIG. 13D, compared with the embodiment in FIG. 2, the axis X2 of the outlet cover 12 rotates 120° anti-clockwise or 240° clockwise relative to the axis X1 of the inlet cover 11. It can be understood that the rotation of the axis X2 of the outlet cover 12 is not limited to that shown in FIGS. 13A to 13D, which shows that the rotation of the axis X2 of the outlet cover 12 is the rotation of different angles located in the same two-dimensional plane, but also the rotation of the three-dimensional space range, that is, the axis X2 can rotate to a plane other than the plane formed by the axis X2 of FIGS. 13A to 13D. The rotation in the plurality of planes constitutes three-dimensional relative rotation. As described above, those skilled in the art can understand that the axis X1 of the inlet cover 11 and the axis X2 of the outlet cover 12 can be arranged in a relatively complete rotation. The relative position distribution of the first part 10 connected with the inlet cover 11, and the second part 20 connected with the outlet cover 12 can also be flexibly changed, which are not limited to the position distribution shown in FIG. 1, to make the mixer and exhaust aftertreatment system adapt to the layout space of different vehicles and the space layout requirements, enhance the versatility of the mixer, and make the space layout of the vehicles compact.

The mixer has good versatility and can also reduce the manufacturing cost of exhaust aftertreatment system and vehicle. Specifically, as shown in FIG. 1, FIG. 2, FIG. 7, FIG. 10 and FIG. 11, in one or more embodiments, the connecting pipe section 13 comprises the first pipe section 1311 and the second pipe section 1312. The first pipe section 1311 comprises the gas inlet 131 and is fixedly connected with the inlet cover 11 to constitute the first assembly unit 201. The second pipe section 1312 comprises a gas outlet 132 and is fixedly connected with the outlet cover 12 to constitute a second assembly unit 202. The first assembly unit 201 and the second assembly unit 202 are connected to constitute the mixer 1. The structure connecting the first assembly unit 201 and the second assembly unit 202, for different space layout requirements, can all adapt the first assembly unit 201 and the second assembly unit 202, and only change the connection structure used to connect the first assembly unit 201 and the second assembly unit 202 of the connection pipe part 13. For example, in the embodiment shown in FIG. 2, the first assembly unit 201 and the second assembly unit 202 are directly connected, and the inlet cover 11 and the outlet cover 12 are directly and detachably connected through the connecting pipe 13. For another example, in the embodiment shown in FIG. 1, the first assembly unit 201 and the second assembly unit 202 are connected through an approximate Z-shaped intermediate pipe with two bends, the first section 1301 is connected to the first assembly unit 201 through the V-clamp 143, and the second section 1302 is connected to the second assembly unit 202 through the V-clamp 144, that is, the inlet cover 11 and the outlet cover 12 are indirectly detachable connected through the connecting pipe 13. For the mixers of the embodiments shown in FIG. 1 and FIG. 2 with different space layout requirements, the same first assembly unit 201 and second assembly unit 202 can be used, and only the connection structure can be changed without redesigning, processing and manufacturing the structure of the mixer and exhaust aftertreatment system according to different space layout requirements, so as to reduce the manufacturing cost of exhaust aftertreatment system and vehicle.

Referring to FIGS. 2 to 9, in some embodiments, the specific structure of the connecting pipe 13 comprises a conical section 134 and a pipe body section 135 connected with it at the downstream of the conical section 134. The conical section 134 is located in the inlet space S1. The wall of the conical section 134 has a plurality of openings 1341 distributed along the circumference. The gas inlet 131 comprises the above-mentioned plurality of openings 1341, and the plurality of openings 1341 are provided with a swirling structure 1342. In this way, the exhaust enters the gas inlet 131 to form a vortex of exhaust, which makes the exhaust and urea spray mix evenly. Referring to FIG. 6A and FIG. 6B, the specific structure of the swirling structure can comprise a swirling vane 1343 arranged at each opening 1341. The extension direction of the swirling vane 1343 is an oblique direction covering the opening 1341 and facing the outside of the conical section. As described in FIG. 6A, the arrow indicates the direction of the exhaust flow, so that the exhaust can form a stronger vortex to ensure good mixing effect of the exhaust and the urea spray, make the urea spray fully decompose and reduce urea crystallization. It can be understood that the number and size of the openings 1341 and the number of corresponding swirling vane 1343 can be reasonably adjusted according to the actual needs, but not limited to the number and size shown in the figure.

Figure 4:
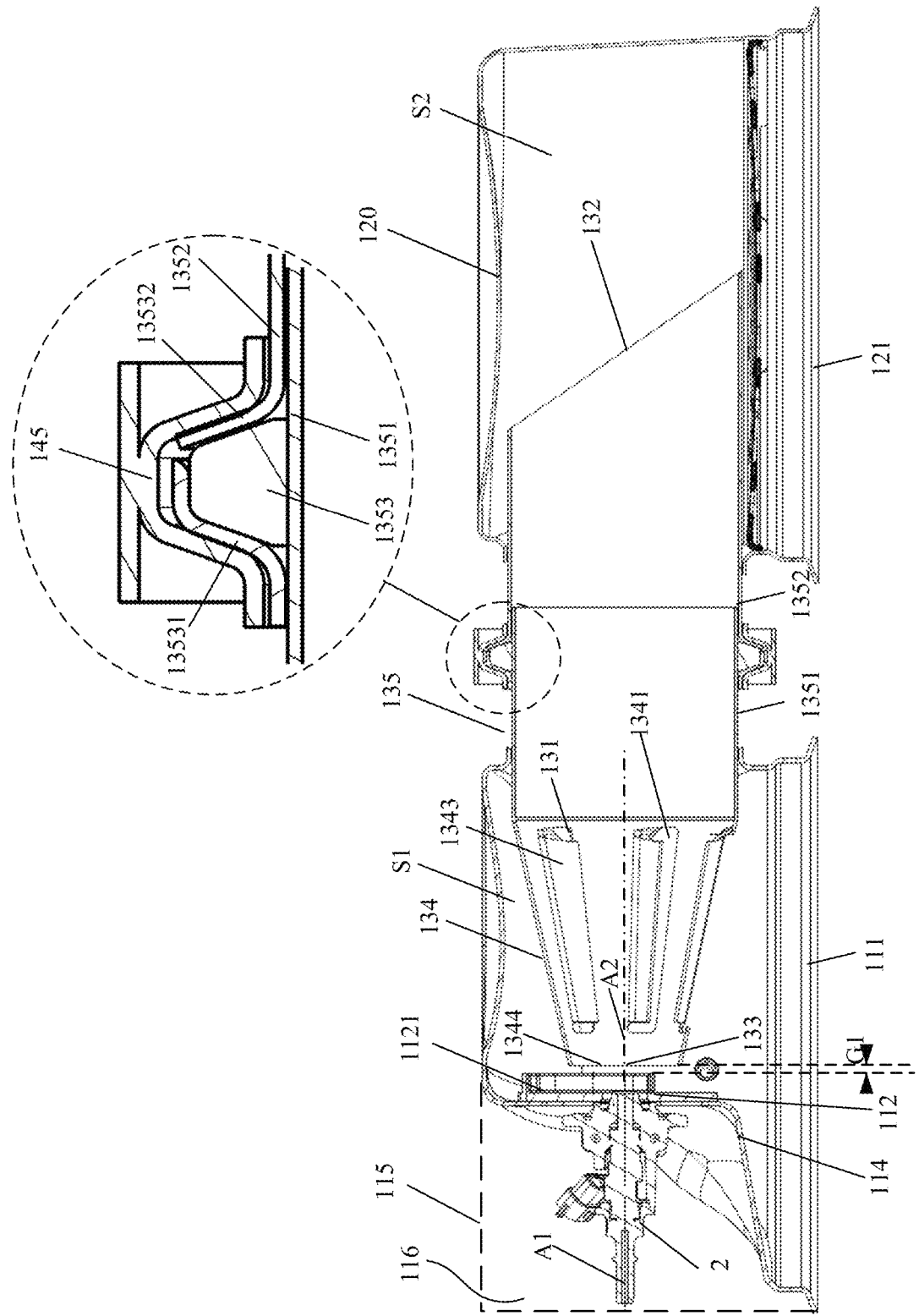
FIG. 4 is a sectional structural diagram of the FIG. 2.

Continuing to refer to FIG. 4, in some embodiments, the structural arrangement in the intake space can also be that the port of the small end of the conical section 1344 provides an injection inlet 133, that is, the urea solution spray sprayed by the injector 2 enters the connecting pipe 13 through the port of the small end of conical section 1344, and is mixed with the exhaust entering from the opening 1341 on the side wall of the conical section 134 and forming a swirl. The inlet cover 11 is provided with an injector mounting base 112, and defines an injection axis A1. The axis A2 of the conical section 134 coincides with the injection axis A1. The conical shape can adapt to the shape of the spray beam of urea spray, and the axis A2 of the conical section 134 coincides with the injection axis A1, making the mixing effect of the exhaust and the urea spray better.

Figure 5:
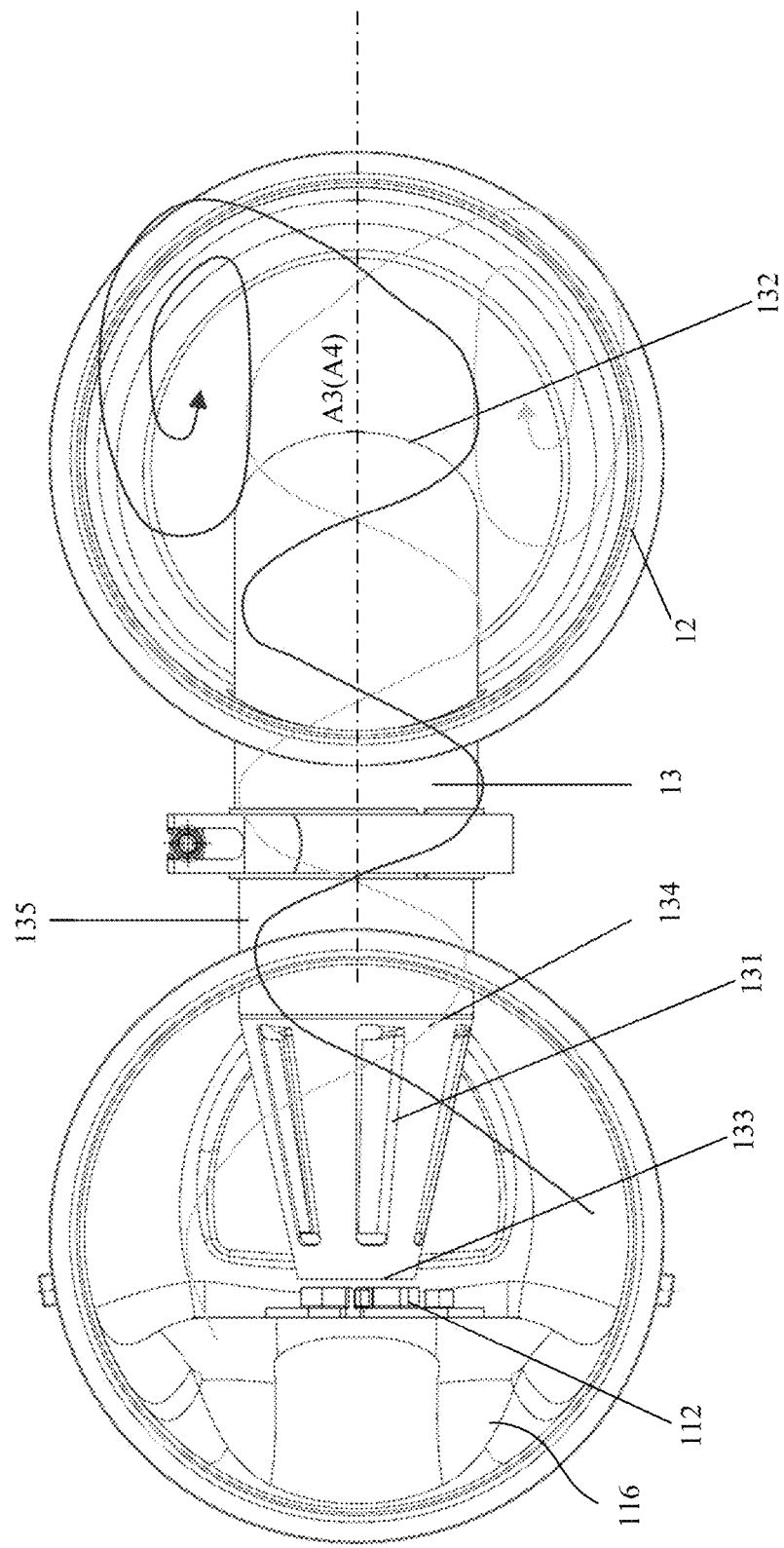
FIG. 5 is a perspective structure diagram of the FIG. 2.
Figure 6B:
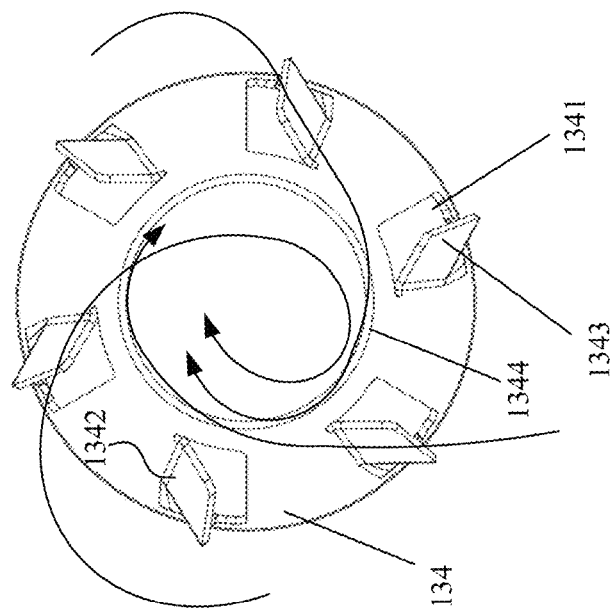
FIG. 6A and FIG. 6B are structural diagrams of the conical section of the mixer of an embodiment.
Figure 6A:
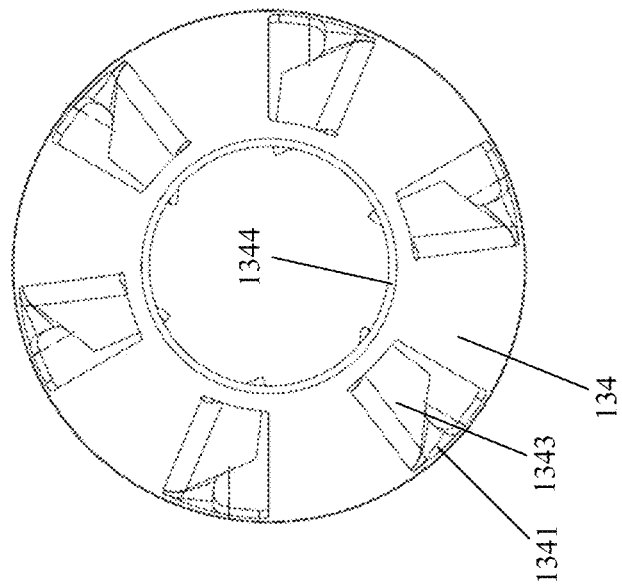
Figure 7:
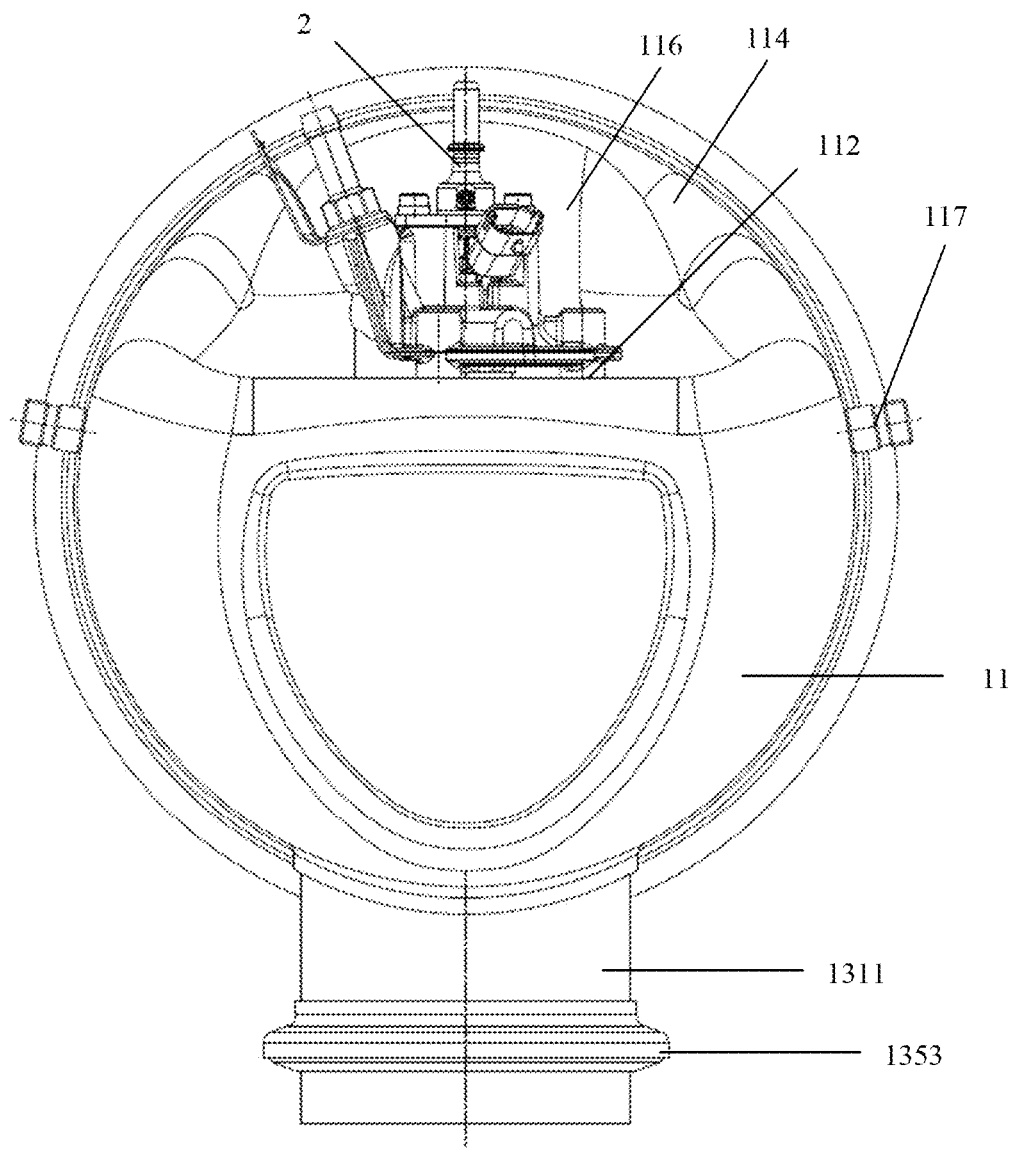
FIG. 7 is a structural diagram of the first assembly unit of the mixer of an embodiment.
Figure 8:
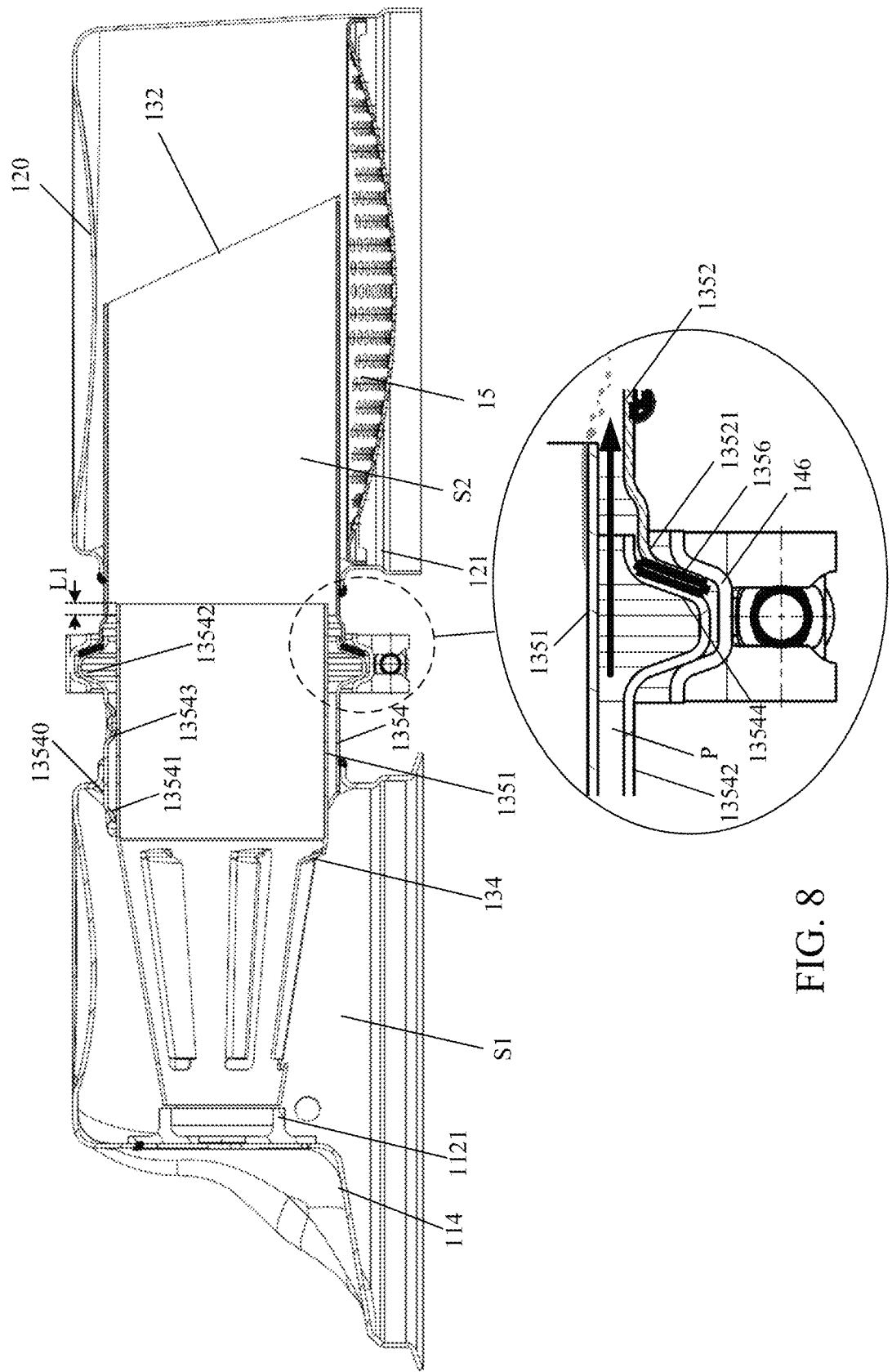
FIG. 8 is a structural diagram of a mixer according to another embodiment.
Figure 14A:
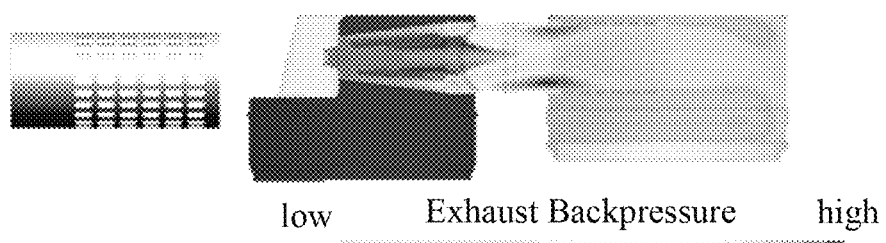
FIG. 14A and FIG. 14B are the simulation results of exhaust back pressure of outlet structures of different connecting pipe parts.
Figure 14B:

Continuing to refer to FIG. 4, FIG. 5 and FIG. 8, in some embodiments, the axis A3 of a part of the connecting pipe 13 located in the outlet space S2 coincides with the symmetrical axis A4 of the outlet cover, and the gas outlet 132 is an oblique notch structure. It can be understood that the "oblique notch" means that the gas outlet 132 and its axis are set obliquely rather than vertically. Such an effect is shown in FIG. 5. The gas flow from the gas outlet 132 can be divided into two swirls, so that the mixing effect of the exhaust and the reducing components in the mixed gas flow is good, and it is easy to be uniformly attached to SCR. Those skilled in the art can adjust the effect of swirl by adjusting the oblique angle of the oblique notch and the distance D between the gas outlet and the downstream end of the gas outlet casing 12. Moreover, as shown in FIG. 14A and FIG. 14B, such a structure can also achieve the effect of reducing the exhaust back pressure. The proposal shown in FIG. 14B shows that the oblique notch in the embodiment is a horn-like structure, that is, the opening size of the oblique notch structure is a flare from upstream to downstream. FIG. 14A shows a comparison proposal of setting a plurality of gas outlets in the circumferential direction of the straight pipe wall. It can be seen from FIGS. 14A and 14B that the exhaust back pressure of the proposal of the embodiment is smaller than that of the comparison proposal. In some embodiments, upper surface 120 of the air outlet cover body 12 is a concave structure, which can improve the natural resonance frequency in the outlet cover 12 to improve the vibration and noise (NVH) performance of the exhaust aftertreatment system and the vehicle. It can be understood that in some embodiments, the upper surface of the inlet cover 11 can also be a concave structure to improve the vibration and noise performance. In addition, in some embodiments, in order to avoid the interference between the cover body and the connecting pipe caused by the concave structure, it can also be a convex structure. Summary, the upper surface of the cover body of the inlet cover 11 and/or the upper surface of the outlet cover 12 can comprise non-flat areas such as concave and convex surfaces.

Continuing to refer to FIG. 4, in some embodiments, the structure of the fixed connecting pipe part 13 can be that the injector mounting base 112 is arranged in non-contact or partial contact with the connecting pipe 13, and the connecting pipe 13 is fixedly connected with the inlet cover 11. Such a beneficial effect is that the durability of mixer 1 is good. The principle thereof is that in the process of completing the present invention, the inventor found that if the conical section 134 and the mounting base 112 are directly welded, the thermal stress fatigue life of the welded connection between the two cannot meet the requirements, and the durability of the direct welding between the two may not meet the requirements due to the vibration load of the vehicle (such as the vibration caused by the engine and the road surface). Therefore, the injector mounting base 112 is arranged in non-contact or partial contact with the connecting pipe 13 and is fixed connected to the connecting pipe 13 through the inlet cover 11. And, corresponding to the injector mounting base 112 provided with a circumferentially extending rib 1121 in the inlet space S1, there is an axial gap G1 between the rib 1121 and the small end of the conical section 1344. It can be understood that the gap between the rib 1121 and the small end of the conical section 1344 is not limited to the axial gap G1 shown in the figure, but also that the small end of the conical section 1344 extends into the space surrounded by the rib 1121, while the side wall of the small end of conical section 1344 has a radial gap with the inner wall of the rib 1121. The beneficial effect of setting the rib 1121 can be that providing a gas flow channel for the exhaust to enter the connecting pipe 13 in addition to the gas inlet 131 (the illustrated embodiment is the plurality of openings 1341) and preventing urea crystallization of the injector 2 by heating the injector 2 with the exhaust. Through the cushioning effect of the rib, it can not only prevent the gas flow of exhaust from directly impacting the spray beam of urea solution sprayed from the injector 2, but also adjust the specific value of the gap according to the actual requirements, to make its lower limit reserve enough margin for processing error, and make its upper limit meet the strength of the swirling flow of exhaust, because a too large gap will allow too much exhaust directly entering from the small end of conical section 1344, and the swirl intensity of exhaust thereby decreases.

Continuing to refer to FIGS. 2 to 5, in some embodiments, the specific structure of the inlet cover 11 can also have a recessed section 114, which provides the installation space 116 of the injector relative to the space of the edge of the cylindrical profile 115 of the inlet cover 11, so that the injector 2 can be located within the range limited by the contour edge of the inlet cover 11, the arrangement of the injector 2 is not affected by the arrangement space of the vehicle, and the exhaust aftertreatment system 100 is easier to meet different arrangement space requirements. In some embodiments, as shown in the figure, the inlet cover 11 has at least two sensor bases 117 symmetrically distributed on the inlet cover 11, but not limited to this, for example, and/or the outlet cover 12 has at least two sensor bases symmetrically distributed on the outlet cover 12. The redundant setting of the plurality of sensor bases 117 ensures accurate sensor measurement results in the case of different orientation of the inlet cover 11 and/or the outlet cover 12 and meets the requirements of the installation position and installation space of the inlet cover 11 and/or the outlet cover 12 under different installation requirements.

With continued reference to FIG. 8, FIG. 12, and FIGS. 13A to 13D, in some embodiments, the open end 121 of the outlet cover 12 is provided with a perforated baffle 15, which is far away from the small end of conical section 120 with respect to the gas outlet 132 of the connecting pipe part 13. In this way, the uniformity of the mixed gas flow out of the outlet cover 12 can be better. The inventor found that this has a particularly significant effect on improving the aftertreatment effect of NOx for the SCR with large volume in the exhaust aftertreatment system. For some SCR with small volume, the uniformity of mixed gas flow can generally meet the requirements, so the perforated baffle 15 can also be omitted.

Referring to FIGS. 2 to 5, in an embodiment, the specific structure of the pipe section 135 may comprise a first pipe section 1351 and a second pipe section 1352 located downstream of the first pipe section 1351. The first pipe section 1351 is connected to the big end of the conical section 134 and fixedly connected with the inlet cover 11, such as welding. The second pipe section 1352 is fixedly connected with the outlet cover 12, such as welding. The connection structure of the first pipe section 1351 and the second pipe section 1352 can be that the outer wall of one of the first pipe section 1351 and the second pipe section 1352 is provided with a sealing member 1353, and the outer wall is overlapped with the inner wall of the other. The outer wall is also provided with a first mating section 13531 that partially surrounds the sealing member 1353 on one side of the sealing member 1353. The other end is extended with a second mating section 13532 surrounding the sealing member 1353 with the other side of the sealing member 1353. The first mating section 13531 and the second mating section 13532 are connected and fixed by the V-clamp 145. For example, as shown in FIG. 4, the outer wall of the first pipe section 1351 is provided with a sealing member 1353, and the outer wall of the first pipe section 1351 is overlapped with the inner wall of the second pipe section 1352. The outer wall of the first pipe section 1351 is provided with a first mating section 13531 that partially surrounds the sealing member 1353 on one side of the sealing member 1353, The end of the second pipe section 1352 extends upstream with a second mating section 13532 that surrounds the sealing member 1353 with the other side of the sealing member 1353. The first mating section 13531 and the second mating section 13532 are connected and fixed through the V-clamp connection 145. Such a connection structure is simple and reliable, as well as easy to assemble and operate.

It can be understood that this arrangement is applicable to the proposal that the inlet cover body 11 and the outlet cover 12 are detachably connected through the connecting pipe part 13. The inlet cover 11 and the outlet cover 12 can also be non-detachably connected through the connecting pipe part 13. In the above embodiment, the specific structure of the pipe section 135 may comprise a first pipe section 1351 and a second pipe section 1352 located downstream of the first pipe section 1351. The first pipe section 1351 is connected with the big end of the conical section 134 and is fixedly connected with the inlet cover 11, such as welding. The second pipe section 1352 is fixedly connected with the outlet cover 12, such as welding. The second pipe section 1352 comprises a gas outlet 132 located in the outlet space S2. The first pipe section 1351 is integrally connected with the second pipe section 1352, that is, the pipe section 135 is an integral part, the first pipe section 1351 is integrally formed with the second pipe section 1352, or separately formed and connected through a welding structure. In this way, it is applicable to the proposal of non-detachable connection, which saves the cost of processing the mating section and the need for sealing members and V-clamps.

Figure 9:
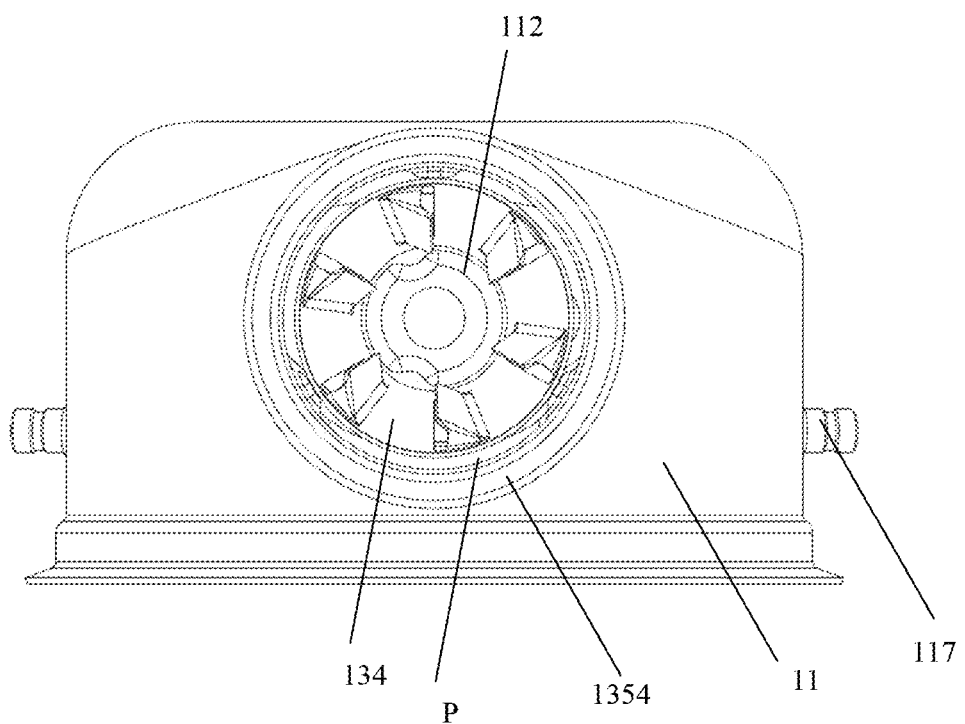
FIG. 9 is a structural diagram of the FIG. 8 in a side view angle.
Figure 10:
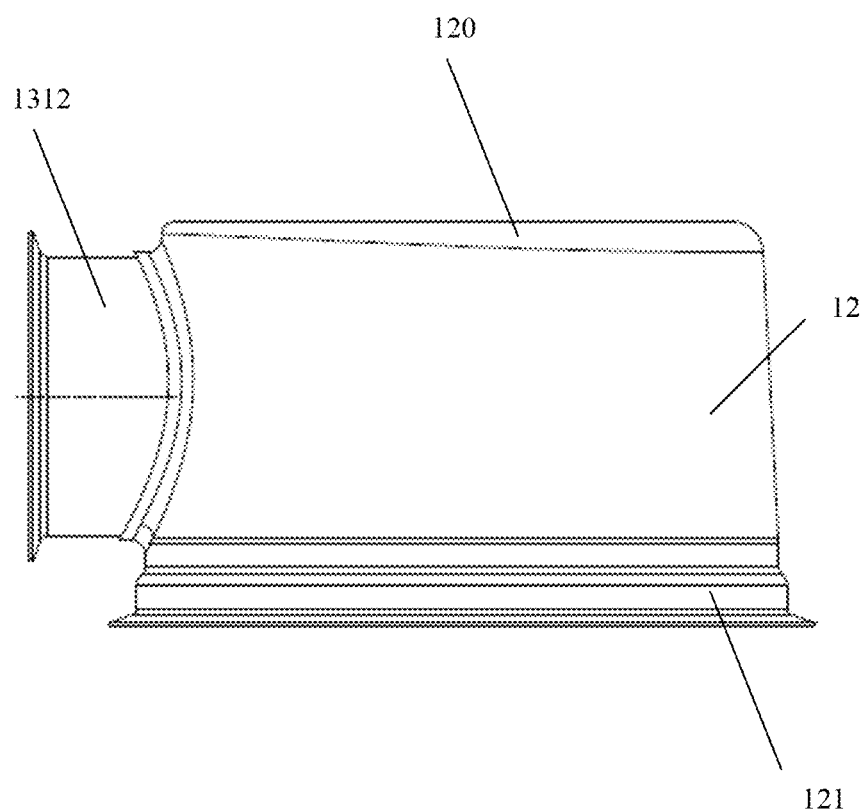
FIG. 10 is a structural diagram of the second assembly unit of the mixer of an embodiment.
Figure 11:
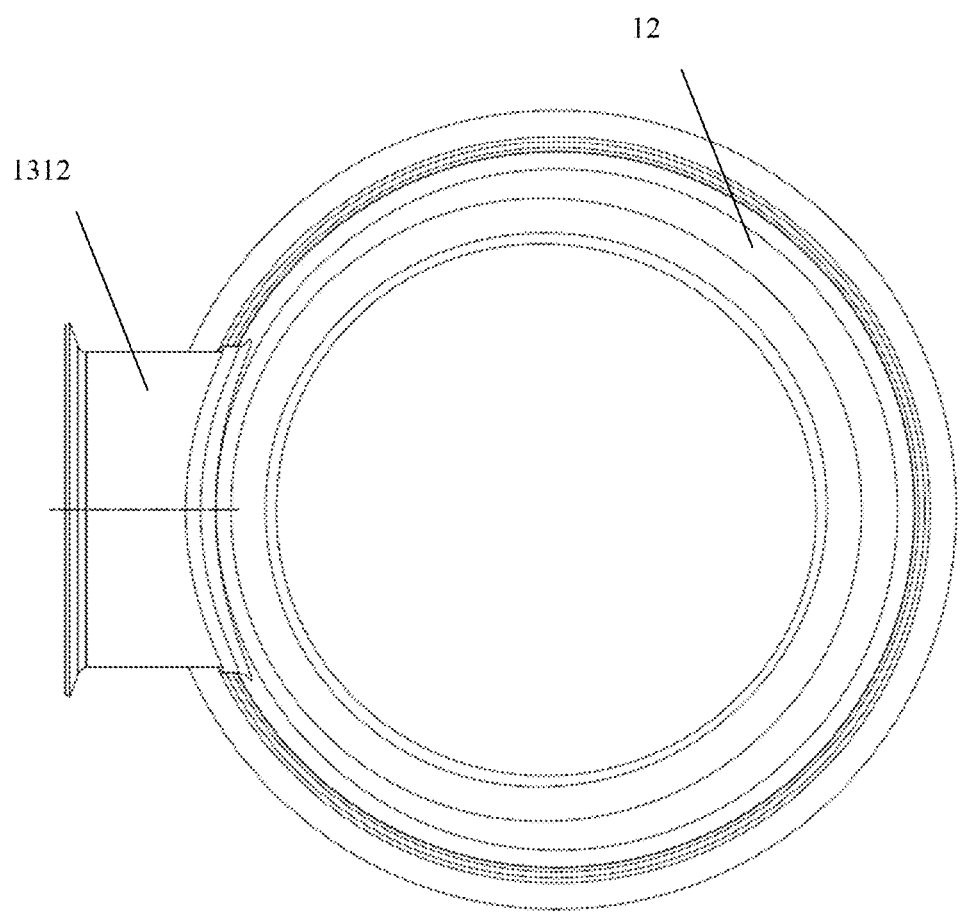
FIG. 11 is a structural diagram of the FIG. 10 in a main view angle.
Figure 12:
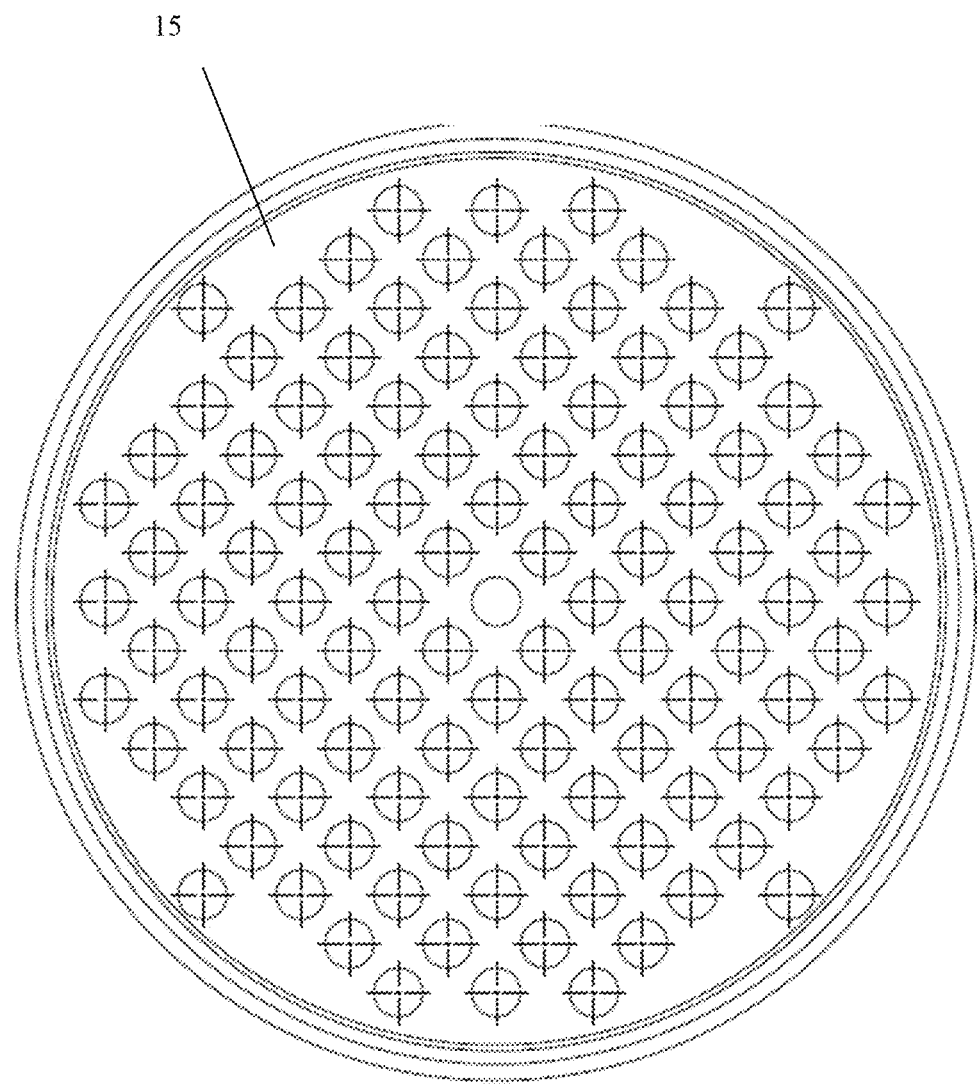
FIG. 12 is a structural diagram of a perforated baffle of a mixer according to an embodiment.

Referring to FIG. 8 and FIG. 9, in another embodiment, the specific structure of the pipe section 135 comprises a first pipe section 1351, a second pipe section 1352 located downstream of the first pipe section 1351, and a connecting sleeve 1354. The first pipe section 1351 is connected to the big end of the conical section, and the connecting sleeve 1354 is sleeved on periphery of the first pipe section 1351. The gap between the connecting sleeve 1354 and the first pipe section 1351 constitutes the exhaust bypass channel P. The connecting sleeve 1354 has a sleeve body 13540 and a first end 13541 and a second end 13542 respectively connected with both ends of the sleeve body 13540. The first end 13541 is fixedly connected with the first pipe section 1351, such as the rivet connection shown in FIG. 8. The sleeve body 13540 is fixedly connected with the inlet cover 11 through a welding structure. The sleeve body 13540 can also have a radial recess 13543 that is radially recessed to the first pipe section, which is connected with the first pipe section 1351 by rivets, so that the connection structure between the casing body 13540 and the first pipe section 1351 is stable. The second end 13542 has a connection flange. A flared structure 13521 is formed by extending from the upstream end of the second pipe section 1352 to the upstream. The flared structure 13521 is overlapped with one side of the downstream side of the connecting flange, and a sealing member 1356 is arranged between them for sealing. The flared structure 13521 and the connecting flange are connected and fixed through the V-clamp 146 to connect the connecting sleeve 1354 with the second pipe section 1352. In addition, the downstream end of the first pipe section 1351 extends axially into the upstream end of the second pipe section 1352 by an axial length L1. The beneficial effects of adopting this embodiment comprise that the gap between the connecting sleeve and the first pipe section constitutes an exhaust bypass channel, which can not only heat the first pipe section, so that the urea solution spray attached to the inner wall of the first pipe section 1351 can be pyrolyzed in time to prevent urea crystallization, but also, even if the urea solution attached to the inner wall forms a liquid film, the liquid film will be purged and decomposed into droplets at the downstream end by the exhaust purging force of the exhaust bypass channel at the downstream end of the first pipe section 1351, and the droplets will be broken to reduce urea crystallization.

It can be understood that the embodiment in the figure is a proposal that the pipe section 135 corresponding to the connecting sleeve 1354 is applicable to the detachable connection of the inlet cover 11 and the outlet cover 12 through the connecting pipe 13. However, it is not limited to this. For example, the detachable connection structure connecting the sleeve 1354 and the second pipe section 1352 can also adopt a structure similar to FIG. 4, that is, the outer wall of one of the second end 13542 of the connecting sleeve 1354 and the second pipe section 1352 are provided with a sealing member 1353, and the outer wall is overlapped with the inner wall of the other. The outer wall is also provided with a first mating section 13531 that partially surrounds the sealing member 1353 on one side of the sealing member 1353, while a second mating section 13532 that partially surrounds the sealing member 1353 on the other side of the sealing member 1353 is extended at the end of the other. The first mating section 13531 and the second mating section 13532 are connected and fixed by the V-clamp 146. The downstream end of the first pipe section 1351 extends axially into the upstream end of the second pipe section 1352 with an axial length L1. In this way, detachable connection can also be realized.

In addition, similarly, in some embodiments, corresponding to the pipe section 135 with the connecting sleeve 1354, the inlet cover 11 and the outlet cover 12 can also be non-detachably connected through the connecting pipe 13. At this time, the second end 13542 of the connecting sleeve 1354 is integrally connected with the second pipe section 1352, that is, the pipe section 135 is an integral part, the connecting sleeve 1354 is integrally formed with the second pipe section 1352, or separately formed and connected through a welding structure. Other structural features are the same or similar to the above embodiments, which will not be repeated here. In this way, it is applicable to the proposal of non-detachable connection, which saves the cost of processing the mating section, the connecting flange and the flared structure, as well as the sealing members and the V-clamps.

In the introduction of the above embodiments, the inlet cover 11, the outlet cover 12, and the connecting pipe 13 constitute a complete mixer 1. However, in the actual processing process, it can also be that the above inlet cover 11 is fixedly connected with the connecting pipe 13 to form a mixer, which is essentially the first mixing unit of the complete mixer 1 recorded in the above embodiment, while the outlet cover 12 is integrated into the exhaust aftertreatment component downstream of the mixer to cover the casing of the exhaust aftertreatment component, which can be, for example, SCR, At this time, the first mixing unit is directly or indirectly connected to the downstream exhaust aftertreatment component. Correspondingly, at this time, the outlet cover 12 is a connecting pipe part for directly or indirectly connecting the first mixing unit.

It can be seen from the above that the beneficial effects of using the above embodiment to introduce the mixer, exhaust aftertreatment system and vehicle comprise, but are not limited to, by using the mixer structure in which the inlet cover body and the outlet cover are detachably connected through the connecting pipe part, the mixer can change the length and extension direction of the pipe body, as well as the orientation of the inlet cover and the outlet cover, so as to make the structure of the mixer flexibly adapt to the installation space layout requirements of different vehicles. The mixer and exhaust aftertreatment system have good versatility, and the space layout of vehicles is compact.

Although the above embodiments of the disclosure are disclosed as above, they are not used to limit the disclosure. Any person skilled in the art can make possible changes and modifications without departing from the spirit and scope of the disclosure. Therefore, any amendments, equivalent changes and modifications made to the above embodiments according to the technical essence of the disclosure without departing from the technical proposal of the disclosure fall within the scope of protection defined in the claims of the disclosure.

We claim:

1. A mixer, comprising:
an inlet cover, providing an inlet space;
an outlet cover, providing an outlet space;
a connecting pipe part, comprising a gas inlet inside the inlet space, a gas outlet inside the outlet space, and an injection inlet;
wherein the connecting pipe part comprises a conical section and a pipe section connected downstream to the conical section, the conical section is located inside the inlet space, a side wall of the conical section comprises a plurality of openings distributed along a circumferential direction, the gas inlet comprises the plurality of openings, and a swirling structure is provided at the plurality of openings; a small end of the conical section provides the injection inlet, the inlet cover is provided with an injector mounting base, defining an injection axis, and an axis of the conical section coincides with the injection axis; and an axis of a part of the connecting pipe inside the outlet space coincides with a symmetry axis of the outlet cover, and the gas outlet is an oblique notch structure.

2. The mixer of claim 1, wherein the swirling structure comprises a swirling vane provided at each opening, and the swirling vane extends in an inclined direction that covers each of the openings and goes outward the conical section.

3. The mixer of claim 1, wherein the injector mounting base and the connecting pipe part are arranged in a partial contact or non-contact manner, the injector mounting base has a rib extending circumferentially inside the inlet space, and there is a gap between the rib and the small end of the conical section, providing a flow path for exhaust to enter the connecting pipe in addition to the gas inlet.

4. The mixer of claim 1, wherein the inlet cover comprises a recessed section, and a space between the recessed section and an edge of a cylindrical profile of the inlet cover provides a mounting space for an injector.

5. The mixer of claim 1, wherein the inlet cover has at least two sensor bases distributed symmetrically on the inlet cover, and/or the outlet cover has at least two sensor bases distributed symmetrically on the outlet cover.

6. The mixer of claim 1, wherein the pipe section comprises a first pipe section and a second pipe section downstream of the first pipe section, the first pipe section is connected to a large end of the conical section and is fixedly connected to the inlet cover, an outer wall of one of the first pipe section and the second pipe section is provided with a sealing member and the outer wall is connected with an inner wall of the other in an overlapped manner, the outer wall is further provided with a first mating section that partially surrounds the sealing member on one side thereof, a second mating section extends from an end of the other and partially surrounds the sealing member on the other side thereof, and the first mating section and the second mating section is fixed connected by a V-clamp.

7. The mixer of claim 1, wherein the pipe section comprises a first pipe section and a second pipe section downstream of the first pipe section, the first pipe section is connected to a large end of the conical section and is fixedly connected to the inlet cover, and the second pipe section comprises the gas outlet inside the outlet space and is fixedly connected to the outlet cover, and the first pipe section and the second pipe section are integrated connected or welded together.

8. The mixer of claim 1, wherein the pipe section comprises a first pipe section, a second pipe section downstream of the first pipe section and a connecting sleeve, the first pipe section is connected to a large end of the conical section, the connecting sleeve is sleeved on periphery of first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, and the second end has a connecting flange; a flaring structure is formed by extending upward from an upstream end of the second pipe section, wherein the flaring structure is connected with downstream side of the connecting flange in an overlapped manner, a sealing member is mounted therebetween for sealing, and the flaring structure and the connecting flange is fixedly connected by a V-clamp, so as to connect the connecting sleeve with the second pipe section; and a downstream end of the first pipe section extends into the upstream end of the second pipe section with an axial length.

9. The mixer of claim 1, wherein the pipe section comprises a first pipe section, a second pipe section downstream of the first pipe section and a connecting sleeve, the first pipe section is connected to a large end of the conical section, the connecting sleeve is sleeved on periphery of the first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, and the second end and the second pipe section are integrated connected or welded together; and a downstream end of the first pipe section extends into an upstream end of the second pipe section with an axial length.

10. The mixer of claim 1, wherein the pipe section comprises a first pipe section, a second pipe section downstream of the first pipe section and a connecting sleeve, the first pipe section is connected to a large end of the conical section, the connecting sleeve is sleeved on periphery of the first pipe section, a gap between the first pipe section and the connecting sleeve forms an exhaust bypass, and the connecting sleeve comprises a sleeve body as well as a first end and a second end that are respectively connected to both ends of the sleeve body, wherein the first end is fixedly connected to the first pipe section, an outer wall of one of the second end and the second pipe section is provided with a sealing member and the outer wall is connected with the inner wall of the other in an overlapped manner, the outer wall is further provided a first mating section that partially surrounds the sealing member on one side thereof, a second mating section extends from an end of the other and partially surrounds the sealing member on the other side thereof, and the first mating section and the second mating section is fixed connected by a V-clamp; and a downstream end of the first pipe section extends into an upstream end of the second pipe section with an axial length.

11. The mixer of claim 1, wherein open size of the oblique notch structure is a flare from upstream to downstream.

12. The mixer of claim 1, wherein an upper surface of the outlet cover comprises a non-flat area, and/or an upper surface of the inlet cover comprises a non-flat area.

13. The mixer of claim 1, wherein an open end of the outlet cover is provided with a perforated baffle, and the perforated baffle is arranged further away from an upper surface of the outlet cover with respect to the gas outlet of the connecting pipe.

14. The mixer of claim 1, wherein the inlet cover and the outlet cover are arranged separately and are detachably connected by the connecting pipe part directly or indirectly.

15. The mixer of claim 14, wherein the connecting pipe comprises a first pipe part and a second pipe part, wherein the first pipe part comprises the gas inlet and is fixedly connected with the inlet cover, forming a first assembly unit; the second pipe part comprises the gas outlet and is fixedly connected with the outlet cover, forming a second assembly unit; and the first assembly unit and the second assembly unit are detachably connected directly or indirectly.

16. The mixer of claim 14, wherein an axis of the inlet cover and the axis of the outlet cover are set to be relatively rotatable in 3D.

17. A mixer, comprising an inlet cover providing an inlet space, and a connecting pipe part that comprises a gas inlet, a gas outlet and an injection inlet, wherein the gas inlet is located inside the inlet space, the connecting pipe is fixedly connected to the inlet cover to form a first mixing unit, and the first mixing unit is used for being directly or indirectly connected to an exhaust aftertreatment component downstream the mixer, wherein the inlet cover and the connecting pipe part are the inlet cover and the connecting pipe part of claim 1.

18. An exhaust aftertreatment component comprising an outlet cover and an exhaust aftertreatment component casing covered by the outlet cover, wherein an exhaust aftertreatment element is provided inside the exhaust aftertreatment component casing, the outlet cover provides a flowing space for gas flow entering the exhaust aftertreatment component, and the outlet cover is used for being directly or indirectly connected to the connecting pipe part of the mixer of claim 17.

19. An exhaust aftertreatment system, comprising the mixer of claim 1, and an injector, wherein the injector sprays a reducing agent solution to an injection inlet of the connecting pipe part.

20. The exhaust aftertreatment system of claim 19, wherein an open end of the inlet cover is connected with a first part of the exhaust aftertreatment system, and an open end of the outlet cover is connected with a second part of the exhaust aftertreatment system.

21. A vehicle, comprising an engine and the exhaust aftertreatment system of claim 19.

* * * * *